(12) United States Patent
Cuavas et al.

(10) Patent No.: US 12,388,914 B2
(45) Date of Patent: Aug. 12, 2025

(54) ZTP MESSAGE EXCHANGE USING KAFKA

(71) Applicant: DISH Wireless L.L.C., Littleton, CO (US)

(72) Inventors: Orlando Cuavas, Littleton, CO (US); Prakash Srinivasan, Highlands Ranch, CO (US); Velmurugan Manoharan, Commerce City, CO (US); Ian King, Cheyenne, WY (US); Nathan Sones, Cheyenne, WY (US)

(73) Assignee: DISH WIRELESS L.L.C., Littleton, CO (US)

( * ) Notice: Subject to any disclaimer, the term of this patent is extended or adjusted under 35 U.S.C. 154(b) by 0 days.

(21) Appl. No.: 18/468,480

(22) Filed: Sep. 15, 2023

(65) Prior Publication Data

US 2025/0097323 A1    Mar. 20, 2025

(51) Int. Cl.
*H04L 69/08*    (2022.01)
*G06F 9/54*    (2006.01)

(52) U.S. Cl.
CPC .............. *H04L 69/08* (2013.01); *G06F 9/546* (2013.01)

(58) Field of Classification Search
CPC ................................. H04L 69/08; G06F 9/546
See application file for complete search history.

(56) References Cited

U.S. PATENT DOCUMENTS

| | | | |
|---|---|---|---|
| 2019/0245740 A1* | 8/2019 | Kachhla | H04L 41/082 |
| 2021/0120104 A1* | 4/2021 | Al-Mufti | H04L 41/0806 |
| 2022/0151022 A1* | 5/2022 | Chikkur Dattatraya | H04L 69/323 |
| 2024/0224071 A1* | 7/2024 | Jampala | H04L 43/04 |

FOREIGN PATENT DOCUMENTS

WO    WO-2024118053 A1 *    6/2024

* cited by examiner

*Primary Examiner* — Cheikh T Ndiaye
(74) *Attorney, Agent, or Firm* — Kilpatrick Townsend & Stockton LLP (57) ABSTRACT

In various embodiments, a messaging system is provided, where message streaming is employed to exchange information among various components in a network to facilitate Zero Touch Provisioning (ZTP hereinafter). In those embodiments, messages may pass through the messaging system via REST API or Kafka with consistent message schemas across the messaging system. In various embodiments, message adaptors are provided when different message schemas of the same message is used in the network.

18 Claims, 5 Drawing Sheets

ZTP MESSAGE EXCHANGE USING KAFKA

BACKGROUND OF THE INVENTION

A Messaging System is responsible for transferring data from one application to another, so the applications can focus on data, but not worry about how to share it. Distributed messaging is based on the concept of reliable message queuing. Messages are queued asynchronously between client applications and messaging system. Two types of messaging patterns are available—one is point to point and the other is publish-subscribe (pub-sub) messaging system. Most of the messaging patterns follow pub-sub.

An API is a set of definitions and protocols for building and integrating application software. It's sometimes referred to as a contract between an information provider and an information user-establishing the content required from the consumer (the call) and the content required by the producer (the response). For example, the API design for a weather service could specify that the user supply a zip code and that the producer reply with a 2-part answer, the first being the high temperature, and the second being the low.

REST is a set of architectural constraints, not a protocol or a standard. API developers can implement REST in a variety of ways. A REST API (also known as RESTful API) is an application programming interface (API or web API) that conforms to the constraints of REST architectural style and allows for interaction with RESTful web services. REST stands for representational state transfer.

When a client request is made via a RESTful API, it transfers a representation of the state of the resource to the requester or endpoint. This information, or representation, is delivered in one of several formats via HTTP: JSON (Javascript Object Notation), HTML, XLT, Python, PHP, or plain text. JSON is the most generally popular file format to use because, despite its name, it's language-agnostic, as well as readable by both humans and machines.

BRIEF SUMMARY OF THE INVENTION

In various embodiments, a messaging system is provided, where message streaming is employed to exchange information among various components in a network to facilitate Zero Touch Provisioning (ZTP hereinafter). In those embodiments, messages may pass through the messaging system via REST API or Kafka with consistent message schemas across the messaging system. In various embodiments, message adaptors are provided when different message schemas of the same message is used in the network.

In some embodiments, the messaging system includes a message bus configured to facilitate real-time message streaming and message exchange; adaptors configured to connect components provided by vendors to the O-RAN, the adaptors including a first adaptor for a first component provided by a first vendor; and connectors configured to connect network components facilitating the O-RAN, the connectors including a first connector for a first network component. In those embodiments, the first adaptor is configured to receive a first message from the first component, translate the first message into a common message format, and provide the first message to the message bus. In those embodiments, the message bus is configured to transmit the first message to the first connector; and the first connector is configured to transmit the first message to the first network component. Other embodiments are contemplated.

DETAILED DESCRIPTION OF THE INVENTION

Zero Touch Provisioning (ZTP) operations for cell sites rely on information regarding the cell sites being properly registered and updated in one or more systems to facilitate the ZTP operations. For example, for a cell site to be integrated into an overall network of a provider, certain information, such as identification of the cell site and one or more devices in the cell site, should be registered so that one or more network addresses can be assigned to the cell site. Depending on a scope of the ZTP operations for the cell sites, various information should be checked and verified in the one or more systems facilitating the ZTP operations. It is desirable that results and/or any issues during the verification be presented to an operator of the ZTP operations to enable the operator to take appropriate measures to address the issues for the cell sites to function properly in the overall network.

One challenge in facilitating ZTP operations in a network is that as the network scales, complexity of the messages passed among various components in the network also grow. For example, in a 5G network, network services or functions are typically deployed in the core network, which may be implemented in one or more clouds. In the 5G network, hardware enables individual cell sites are typically deployed around edges of the 5G network. ZTP operations in the network, for example provisioning servers and/or devices in an individual cell site, typically various components within the network. For instance, various information regarding infrastructure in the individual cell sites should be registered and/or managed in an inventory database, information regarding network addressability of the cell sites should be managed in a network management database, workflow or procedure for provisioning the cell sites should be managed by a workflow management system, and so on. It is thus desirable to have consistent message schemas in a messaging system in the network such that components of the network can be added or removed in the network without having to redesign the messaging system.

One insight provided by the present disclosure is that messages among various components facilitating ZTP operations can pass through REST API or Kafka with consistent message schemas across the network. Various message adapters can be developed for facilitating the consistent message exchange across the network. For example, a message adapter can be developed for a vendor to facilitate communication with one or more components provided by that vendor and integrate message schemas for those components into a messaging system facilitating the ZTP operations in the network.

Example O-RAN

Figure 1:
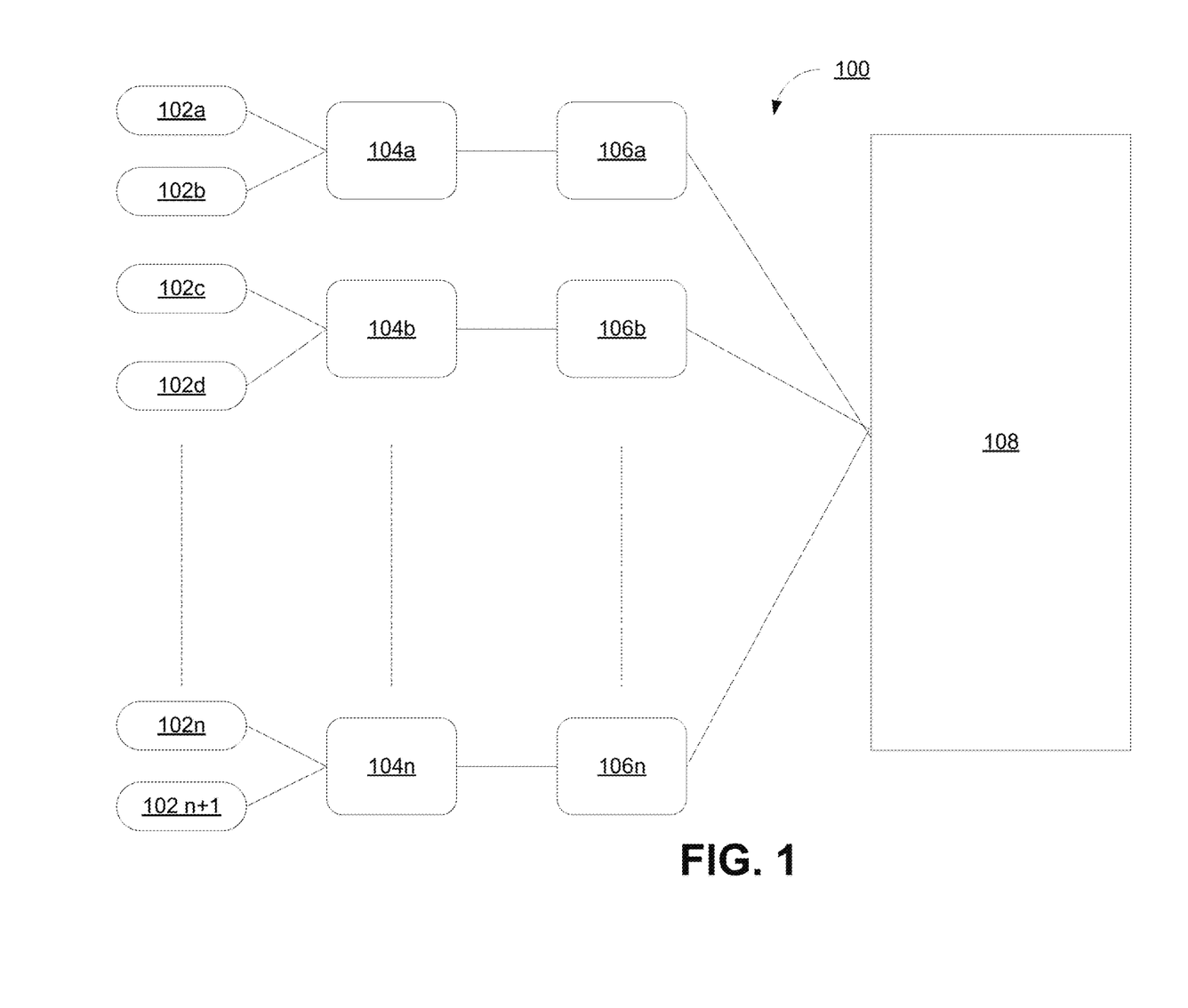
FIG. 1 illustrates an example system architecture of an O-RAN in which validation for ZTP operations are implemented in accordance with the present disclosure.

Open radio access network ("O-RAN" herein) is a standard that allows a telecommunications network with all its functions, except necessary hardware components facilitating radio access, to be implemented in a cloud with automated deployment and operations. FIG. 1 generally illustrates an example system architecture of an O-RAN in which validation for ZTP operations are implemented in accordance with the present disclosure. It should be understood that the example system architecture shown in FIG. 1 is not particularly limited to a type of network-such as 4G or 5G. Although, some embodiments in the present disclosure are described and illustrated in the context of 5G, the example system architecture shown in FIG. 1 is intended to show a general environment in which technologies in accordance with the present disclosure can be applied. One skilled in the art will understand how to apply the technologies in accordance with the present disclosure to a network environment described by the example system architecture shown in FIG. 1.

As shown in FIG. 1, the example system architecture 100 of an O-RAN in accordance with the present disclosure comprises multiple cell sites, such as cell sites 102a, b, c, d, . . . , n, n+1. As illustrated in this example, within a given cell site, such as 102a, one or more radio units (RU) are installed in the O-RAN in accordance with the present disclosure. A given one of the RUs in the given cell site comprises hardware components such as radio frequency (RF) transceivers, antennas configured to transmit and receive RF signals from/to end user equipment (UE), such as smartphones. In various implementations, RUs in different cell sites in the example system architecture 100 can be provided by different hardware vendors. It is contemplated that in some embodiments, the cell sites in the example system architecture 100 are heterogenous in terms of hardware they are implemented in.

Also shown in FIG. 1 are distributed units (DUs) 104a, 104b . . . and 104n. A given one of the DUs, such as 104a in this example, is configured to facilitate real-time baseband processing function. Various protocols can be configured into the given DU, such as RLC, PDCP MAC and/or any other lower-level protocols. In various implementations, the given DU is configured to communicate with at least one RU in a cell site. For example, as shown in this example, the DU 104a is configured to communicate with the RUs in cell sites 102a and 102b, the DU 104b is configured to communicate with the RUs in cell sites 102c and 102d, and DU 104n is configured to communicated with the RUs in cell sites in 102n and 102n+1. It should be understood that the communications illustrated between the DUs and the cell sites in FIG. 1 are merely illustrative and thus should not be understood as limiting a scope of the O-RAN in accordance with the present disclosure. That is, the O-RAN in accordance with the present disclosure is not limited to one DU connected only to two cell sites as illustrated in FIG. 1. One skilled in the art understands that the O-RAN in accordance with the present disclosure can comprise a DU configured to however many cell sites.

A given communication link between a given DU and given RU in a cell site is typically referred to as a fronthaul—for example, the links between cell sites 102a/b and DU 104a. In that example, the DU 104a is configured to consolidate and process inbound traffic from RUs in the cell sites 102a/b, distributes traffic to the RUs in the cell sites 102a/b. In implementations, the DUs can be located near the cell sites they have communication with or centralized in a local data center provided by a vendor. In some implementations, various functionalities in the DUs can be implemented using software.

Still shown in FIG. 1 are centralized units (CUs), such as CU 106a, 106b, and 106n. A given one of the CUs is configured to handle higher layers of communication protocols as compared to a DU. For example, less time-sensitive packet processing, such as SDAP, RRC or PDCP, may be implemented in the given CU. It should be understood that functionality split between CU and DU is not intended to be specifically limited in the present disclosure. It is understood that such a split can be a design choice for a particular O-RAN. That is, the present disclosure should not be understood as being limited to a specific version or specific versions of O-RAN, where splits between CU and DU are specifically defined. For example, the DU can be co-located with the CU, or the DU can be bundled with the RU. The DU can also run standalone. Collectively, RUs, DUs, and a CU can create a gNodeB, which serves as a radio access network (RAN) of example system architecture 100.

In implementations, CUs in an O-RAN in accordance with the present disclosure can be implemented using software. In some embodiments, the given CU may be located in a data center provided by a third party vendor. In some embodiments, one or more of the given CU can be located in the data center. The individual links between a CU and DU is typically referred to as a midhual link, for example the link between 104a and 106a shown in this example.

FIG. 1 also shows a core network 108. The core network 108 is configured to enable end users to access services such as phone calls, internet, etc. In various embodiments, the core network 108 is configured to handle operations such as subscriber location, profile, authentication, and/or any other operations. In those embodiments, such operations can facilitate the end users to employ communication technologies (such as 5G) through the example system architecture 100. In some embodiments, the services and/or operations provided by the core network 108 are implemented using software. Although only one core network 108 is shown in FIG. 1, this is not intended to be limiting. It should be understood the example system architecture 100 is not intended to be limited to 5G. It is understood embodiments provided herein can be applied to other types of cell sites when appropriate, such as LTE, 3G, 6G, WIFI or any other types of networks.

In various other examples, more than one core network 108 can be included in the O-RAN in accordance with the present disclosure. Links between a CU and the core network 108 are typically referred to as backhaul links, for example, the link between CU 106a and core network 108 shown in this example. The fronthaul links, midhaul links, and backhaul links shown in FIG. 1 may be collectively referred to as a transport layer for the example system architecture 100. In various embodiments, the transport layer is configured to handle end-to-end communication over the O-RAN in accordance with the present disclosure.

Figure 2:
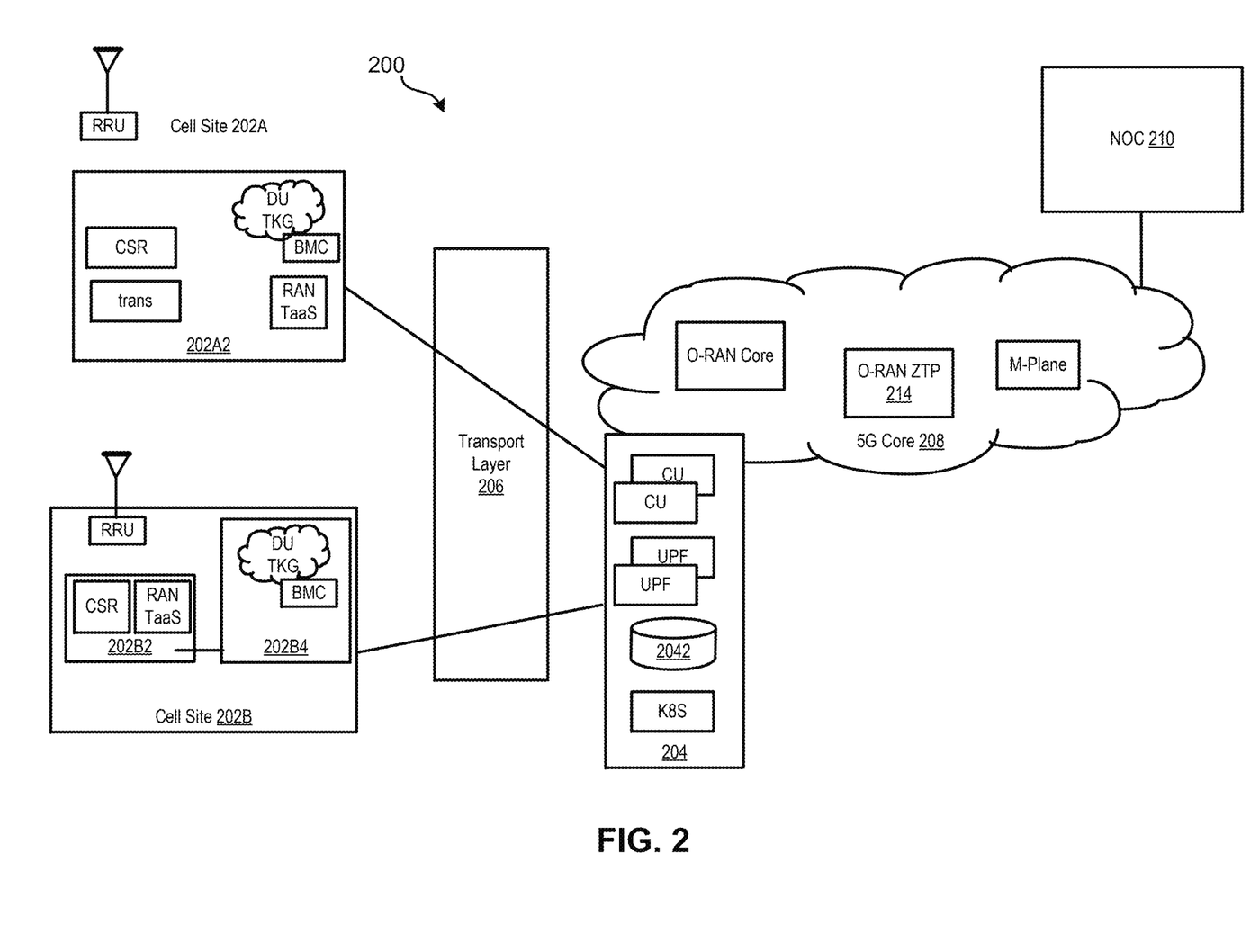
FIG. 2 illustrates an example system architecture of a 5G O-RAN implement in a cloud.

With an example system architecture 100 of O-RAN in accordance with the present disclosure having been generally described and illustrated, attention is now directed to FIG. 2, where an example system architecture 200 of a 5G O-RAN implement in a cloud is generally illustrated.

Example System Architecture of 5G O-RAN

As shown FIG. 2, the example system architecture 200 of a 5G O-RAN comprises a cell site 202a, a cell site 202b, and/or any other cell site(s). As shown, each of the cell site 202a, and 202b, in this example, includes a remote radio unit (RRU). In this example, one or more computing devices, located outside the cell site 202*a*, are configured to implement a cell site router (CSR), a DU, a baseband management controller (BMC), a RAN TaaS (test as a service), and/or any other components. In some embodiments, the computing device includes a processor configured to implement various components mentioned above. In one embodiment, the computing device(s) 202*a*2 includes an operating system such as a Linux system to implement these components. In that embodiment, the computing device(s) 202*a*2 is located in a cabinet within a proximity of the cell site 202*a*. In that embodiment, the cell site 202*a* is referred to as a "lite site".

The cell site 202*b* includes a computing device 202*b*2 and another computing device 202*b*4. In this example, the computing devices 202*b*2 and 202*b*4 are located within the cell site 202*b*. In one embodiment, the computing devices 202*b*2 and 202*b*4 are located in a cabinet within the cell site 202*b*. In that embodiment, the cell site 202*b* is referred to as a "dark site".

As shown, in this example, the computing device 202*b*2 is configured to implement the CSR, RAN TaaS, and/or any other components, while the computing device 202*b*4 is configured to implement the DU (for example, hosting Tanzu Kubernetes Grid (TKG)), BMC, and/or any other components. This is to show cell sites in a 5G O-RAN in accordance with the present disclosure can have computing devices located within the cell sites and configured to implement various components whose functionalities attributed to the DU, CSR or RAN TaaS. That is, the 5G O-RAN in accordance with the present disclosure is not intended to be limited such that DU and CSR/RAN TaaS are implemented on different computing devices, and/or outside the cell site. In some embodiments, the RAN TaaS for a specific cell site such as 202*a* or 202*b* can include tests designed to components and functionalities within the specific cell site, functionalities with another cell site (e.g., adjacency testing), and/or end-to tend testing.

In various embodiments, the RAN TaaS shown in this example is implemented using software and is configured to test and ensure one or more O-RAN components—e.g., the RRU or CSR, in the cell sites are performing in compliance with O-RAN standards. Various tests or test suites can be configured into RAN TaaS to cause target components in the cell sites to be run under preset test conditions. A goal of such a test or test suite in the RAN TaaS is to verify that individual components in the cell sites can handle expected traffic and functionality. In some embodiments, tests in the RAN TaaS are run continuously on a preset or configured frequency to ensure the above-mentioned types of testing of the specific cell sites are in compliance with the O-RAN standards continuously.

As shown FIG. 2, the cell sites 202*a* and 202*b* are connected, via the transport layer 206, to a data center 204 configured to host one or more CUs, and one or more UPFs (user plane functions) implementing at least one user plane layer, and/or any other components. In one embodiment, the data center 204 is referred to as a breakout edge data center (BEDC). In general, the data center 204 is configured to accommodate the distributed nature of various functions in the example system architecture 200 of a 5G O-RAN. In that embodiment, the BEDC hosts various 5G network functions (NFs) that have low latency requirement. In that embodiment, the BEDC provides internet peering for general 5G service and enterprise customer-specific private network service.

Shown in this example is a storage 2042 configured to store various (Cloud-native Network Functions) CNFs and artifacts for facilitating implementations of the DUs and CUs in the example system architecture 200 of the 5G O-RAN. Examples of the storage 2042 can include Amazon S3, GitHub, Harbor and/or any other storage services.

In some embodiments, such as shown in FIG. 2, the data center 204 can include one or more Kubernetes (also known as K8S) configured to facilitate automation of deployment, scaling, and management of various software/applications deployed within the data center 204 and/or within one or more cell sites operatively communicating with the data center 204 through the transport layer 206.

5G Core 208 can be implemented such that it is physically distributed across data centers or located at a central national data center (NDC) and/or regional data center (RDC). In this example, 5G core 208 performs various core functions of the 5G network. In implementations, 5G core 208 can include an O-RAN core implementing various 5G services and/or functions such as: network resource management components; policy management components; subscriber management components; packet control components; and/or any other 5G functions or services. Individual components may communicate on a bus, thus allowing various components of 5G core 208 to communicate with each other directly. Implementations 5G core 208 can involve additional other components.

Network resource management components can include: Network Repository Function (NRF) and Network Slice Selection Function (NSSF). NRF can allow 5G network functions (NFs) to register and discover each other via a standards-based application programming interface (API). NSSF can be used by AMF to assist with the selection of a network slice that will serve a particular UE.

Policy management components can include: Charging Function (CHF) and Policy Control Function (PCF). CHF allows charging services to be offered to authorized network functions. A converged online and offline charging can be supported. PCF allows for policy control functions and the related 5G signaling interfaces to be supported.

Subscriber management components can include: Unified Data Management (UDM) and Authentication Server Function (AUSF). UDM can allow for generation of authentication vectors, user identification handling, NF registration management, and retrieval of UE individual subscription data for slice selection. AUSF performs authentication with UE.

Packet control components can include: Access and Mobility Management Function (AMF) and Session Management Function (SMF). AMF can receive connection and session related information from UE and is responsible for handling connection and mobility management tasks. SMF is responsible for interacting with the decoupled data plane, creating updating and removing Protocol Data Unit (PDU) sessions, and managing session context with the User Plane Function (UPF).

In one O-RAN implementation, DUs, CUs, 5G core 208 and/or any other components in that O-RAN, is implemented virtually as software being executed by general-purpose computing equipment, such as those in one or more data centers. Therefore, depending on needs, the functionality of a DU, CU, and/or 5G 208 core may be implemented locally to each other and/or specific functions of any given component can be performed by physically separated server systems (e.g., at different server farms). For example, some functions of a CU may be located at a same server facility as where the DU is executed, while other functions are executed at a separate server system. In some embodiments, DUs may be partially or fully added to cloud-based cellular network components. Such cloud-based cellular network components may be executed as specialized software executed by underlying general-purpose computer servers. Cloud-based cellular network components may be executed on a third-party cloud-based computing platform. For instance, a separate entity that provides a cloud-based computing platform may have the ability to devote additional hardware resources to cloud-based cellular network components or implement additional instances of such components when requested.

In implementations, Kubernetes (K8S), or some other container orchestration platform, can be used to create and destroy the logical DU, CU, 5G core units and subunits as needed for the O-RAN to function properly. Kubernetes allows for container deployment, scaling, and management. As an example, if cellular traffic increases substantially in a region, an additional logical DU or components of a DU may be deployed in a data center near where the traffic is occurring without any new hardware being deployed. (Rather, processing and storage capabilities of the data center would be devoted to the needed functions.) When the need for the logical DU or subcomponents of the DU is no longer needed, Kubernetes can allow for removal of the logical DU. Kubernetes can also be used to control the flow of data (e.g., messages) and inject a flow of data to various components. This arrangement can allow for the modification of nominal behavior of various layers.

In implementations, the deployment, scaling, and management of such virtualized components can be managed by an orchestrator (such as Kubernetes) in the 5G core 208. The orchestrator can trigger various software processes executed by underlying computer hardware. In implementations, the one or more management functions (managing the 5G core 208, and/or the example system architecture 200 in general) can be implemented in the 5G core 208, for example through a M-Plane. The M-Plane can be configured to facilitate monitoring of O-RAN and determining the amount and location at which cellular network functions should be deployed to meet or attempt to meet service level agreements (SLAs) across slices of the cellular network.

In various implementations, the orchestrator can allow for the instantiation of new cloud-based components of the example system architecture 200 of the 5G O-RAN. As an example, to instantiate a new DU, the orchestrator can perform a pipeline of calling the DU code from a software repository incorporated as part of, or separate from, cellular network 120; pulling corresponding configuration files (e.g., helm charts); creating Kubernetes nodes/pods; loading DU containers; configuring the DU; and activating other support functions (e.g., Prometheus, instances/connections to test tools).

In some implementations, a network slice functions as a virtual network operating on example system architecture 200 of the 5G O-RAN. In those implementations, example system architecture 200 of the 5G O-RAN is shared with some number of other network slices, such as hundreds or thousands of network slices. Communication bandwidth and computing resources of the underlying physical network can be reserved for individual network slices, thus allowing the individual network slices to reliably meet particular SLA levels and parameters. By controlling the location and amount of computing and communication resources allocated to a network slice, the SLA attributes for UE on the network slice can be varied on different slices. A network slice can be configured to provide sufficient resources for a particular application to be properly executed and delivered (e.g., gaming services, video services, voice services, location services, sensor reporting services, data services, etc.). However, resources are not infinite, so allocation of an excess of resources to a particular UE group and/or application may be desired to be avoided. Further, a cost may be attached to cellular slices: the greater the amount of resources dedicated, the greater the cost to the user; thus optimization between performance and cost is desirable.

Particular network slices may only be reserved in particular geographic regions. For instance, a first set of network slices may be present at a given RU and a given DU, a second set of network slices, which may only partially overlap or may be wholly different than the first set, may be reserved at the given RU and the given DU.

Further, particular cellular network slices may include some number of defined layers. Each layer within a network slice may be used to define QoS parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

In some embodiments, the 5G core 208 implements a O-RAN ZTP (zero touch provisioning) layer. In general, in those embodiments, the O-RAN ZTP layer is configured to facilitate automation of the deployment workflow within the example system architecture 200 of the 5G O-RAN. ZTP is commonly known as automated deployment of software (new or updates) to various components in a system with as little human intervention as possible. In the context of example system architecture 200 of the 5G O-RAN, ZTP means automated deployment of software (new or updates) to hardware and/or software components such as RUs, CSRs, DUs, CUs, and various modules in the 5G core 208 with little human intervention. For example without an engineer having to be present at a specific cell site such as 202a or 202b, O-RAN ZTP can facilitate automatic update of a DU with the latest DU software. It should be understood the O-RAN ZTP layer is referred to a set of components that work together to facilitate automatic deployment of software in the example system architecture 200 of the 5G O-RAN with little human intervention. Thus, although, the O-RAN ZTP layer is shown being implemented in the 5G core 208 in FIG. 2, it is merely illustrative. That is, the O-RAN ZTP in accordance with the present disclosure is not intended to be limited to components implemented a core of the O-RAN in accordance with the present disclosure. In some other examples, one or more components of the O-RAN ZTP can be implemented in, for example, CUs or DUs in the O-RAN in accordance with the present disclosure. For instance, as will be described below, adaptors configured to communicate with devices or components of different vendors for ZTP operations can be implemented in CUs or DUs.

Also shown in FIG. 2 is a NOC 210 (Network Operation Center). In some embodiments, the NOC 210 is implemented on a general-purpose computing device. In those embodiments, one or more interfaces are implemented in the NOC 210. In those embodiments, the interfaces represent virtual dashboards that can facilitate automatic deployment of software to various components in the example system architecture 200 of the 5G O-RAN. For instance, an interface is provided in the NOC 210 to enable an operator to set a schedule to update one or more network services in the 5G core 208. As another illustration, an interface is provided in the NOC 210 to enable the operator to push software to a specific component in a cell site (such as 202a or 202b) or in a data center (such as 204) to configure or update the component. One or more requests can be generated by the NOC 210 to instigate the deployment of the software as scheduled or intended by the operator. The request(s) can be received by the O-RAN ZTP layer, which in turn can generate one or more commands to deploy the software to the component. Although one NOC 210 is shown in this example, this is not intended to be limiting. More than one NOCs are typically deployed in the example system architecture 200 of the 5G O-RAN. In some implementations, a given NOC may be provided by a vendor to the 5G O-RAN. For instance, the vendor may be a software develop that provides components or services to the example system architecture 200 of a 5G O-RAN. In that instance, the given NOC is a computing device or system on a premise of the software developer.

Components such as DUs, CUs, the orchestrator, O-RAN ZTP layer, interfaces in the NOC 210, and/or any other components in the 5G core 208 may include various software components communicating with each other, handling large volumes of data traffic, and be able to properly respond to changes in the network. In order to ensure not only the functionality and interoperability of such components, but also the ability to respond to changing network conditions and the ability to meet or perform above vendor specifications, significant testing must be performed.

Example Messaging System

Amazon Managed Streaming for Apache Kafka (Amazon MSK) is an AWS streaming data service that manages Apache Kafka infrastructure and operations, making it easy for developers to run Apache Kafka applications and Kafka Connect connectors on AWS, without the need to become experts in operating Apache. In various embodiments, an AWS Kafka message bus is employed for communication with network components provided by different vendors in a hybrid cloud network.

In various embodiments, cloud native messaging system is developed for facilitating ZTP operations across the cloud using a set of consistent message schema. In some embodiments, connectors are developed between the AWS MSK and Confluence Kafka message bus so that ZTP operations can be pushed to the various components from different vendors even if they may have different message formats. That is, a set of message schemas are used at ZTP orchestration level to push ZTP operations to various components in the network and the messages are translated into message formats understood by the various components at AWS MSK message bus.

Figure 3:
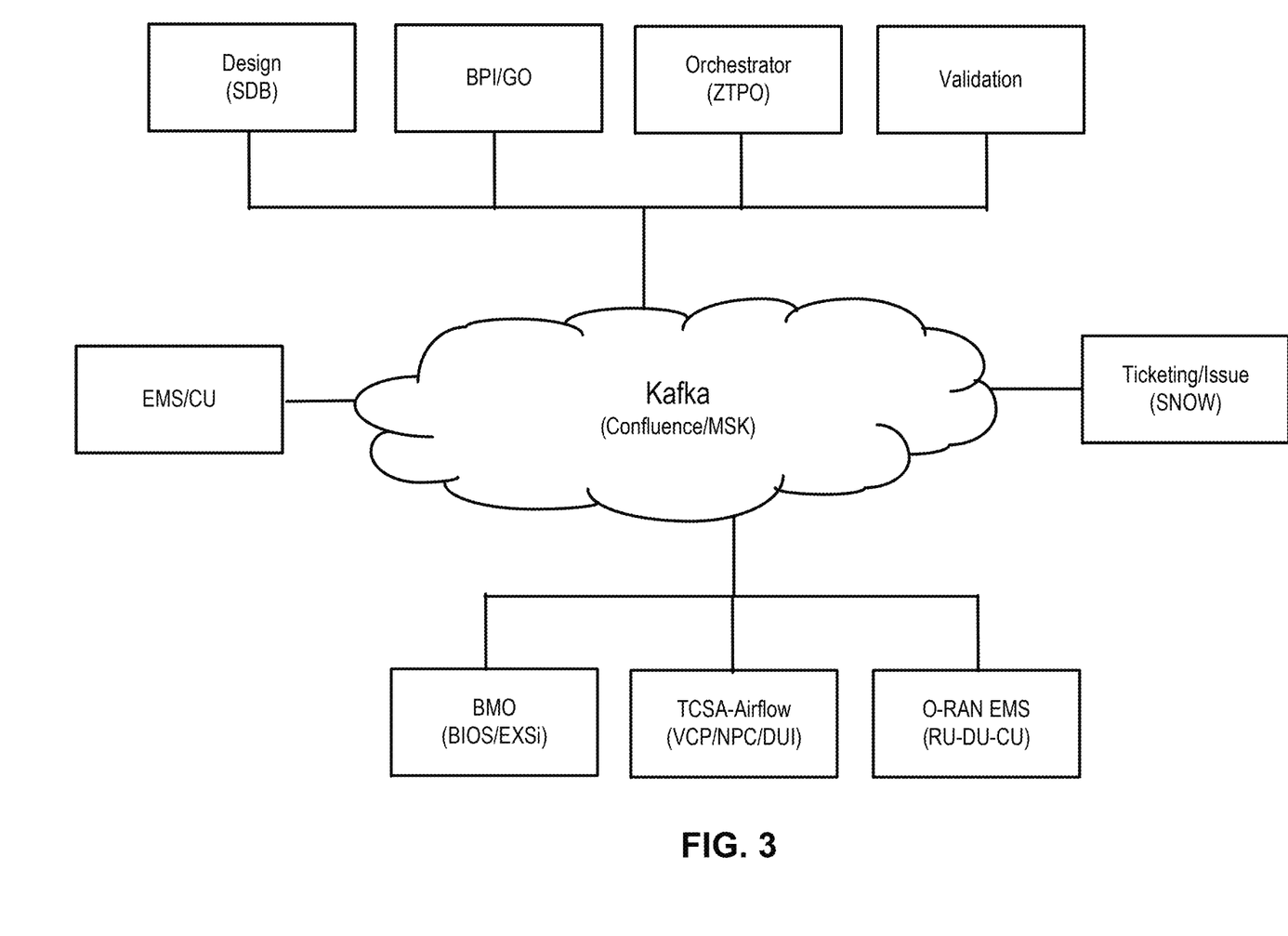
FIG. 3 generally illustrates an example of a messaging system configured to facilitate ZTP operations among various components in a cloud network such as the ones shown in FIG. 1 and FIG. 2.

FIG. 3 generally illustrates an example of a messaging system configured to facilitate ZTP operations among various components in a cloud network such as the ones shown in FIG. 1 and FIG. 2. As can be seen, in this example, the various components are connected to a Kafka messaging system comprising a confluence platform and a MSK bus. In this example, the components include a design specification database (SDB) configured to manage various RAN design and/or engineering data; a flow management component such as BPI/GO shown in this example, an orchestrator (ZTPO) configured to facilitate orchestration of one or more ZTP operations in an O-RAN; a validation component; a ticketing/issue component such as SNOW shown in this example; various CU components; a bare metal orchestrator (BMO), a site manage component such as the Telco Cloud Automation (TCA) shown in this example, an RAN EMS component for RU-DU-CU chaining, and/or any other components.

As mentioned, Kafka is a real-time data streaming messaging platform capable of information exchange on a large scale. In various embodiments, Kafka is based on the abstraction of a distributed commit log. By splitting a log into partitions, Kafka can scale-out systems. As such, Kafka models events as key/value pairs. Internally, keys and values are just sequences of bytes, but externally in your programming language of choice, they are often structured objects represented in your language's type system. Kafka famously calls the translation between language types and internal bytes serialization and deserialization. The serialized format is usually JSON, JSON Schema, Avro, or Protobuf.

Kafka was designed with scale in mind. It is also capable of scaling horizontally to handle extremely high fanout and throughput as needed. Kafka is a data streaming technology for use cases that require high performance and increasing adoption within an organization. However, due to its distributed architecture, the operational burden of managing Kafka can quickly become a limiting factor on either adoption or developer agility.

In general, there are two types of Kafka managed services: cloud-native and cloud hosted. A cloud-native service for Kafka, such as Confluent Cloud, is one that is built from the ground up specifically for the cloud. It embraces the scalability and elasticity of cloud infrastructure by decoupling compute and storage and abstracting the underlying complexities of operating Kafka. With this type of service, users can focus on their applications; operational tasks such as deployment, maintenance, scaling, and security management are automatically handled.

A hosted service for Kafka, such as Amazon Managed Streaming for Apache Kafka (Amazon MSK), is one that takes existing software and installs it in a cloud environment and adds automation to some operations. With this implementation, the end user is still required to manage and monitor clusters at a broker level.

One insight provided by the present disclosures is that messaging for various network components (such as the ones shown in FIG. 3) within the network should be consistent regardless of the underlying vendor and/or infrastructure variety. This type of messaging may be thought of as an "official language" understood by those network components. For instance, a message indicating an instruction to drive a network function for certain operations should be consistent regardless an initiator of the message is from this vendor or that vendor.

However, a challenge is that vendors can have different message or communication formats for components they provide in the network. Thus, either a vendor is to incorporate a message schema used in the network into their component or the message schema is "translated" to the vendor messaging format to facilitate network communications among components provided by that vendor and components in the network providing various network function.

Figure 4:
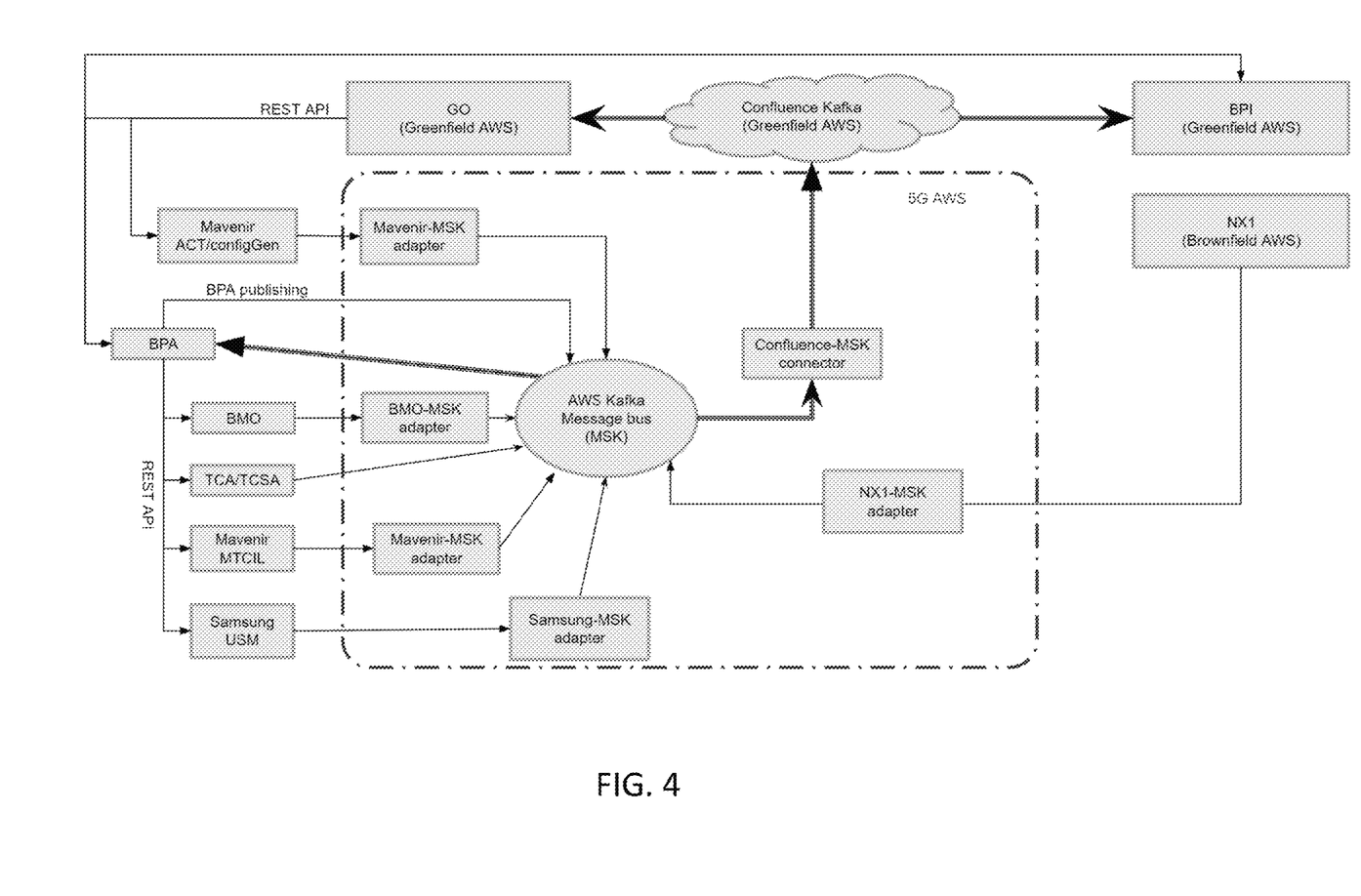
FIG. 4 illustrates a more detailed view of FIG. 3 with different messaging schema shown.

In some embodiments, the aforementioned "translation" approach is achieved by developing MKS-adaptors for components provided by the vendor, and by developing connectors between MKS and Confluent platform. FIG. 4 generally illustrates an example of this approach. FIG. 4 illustrates a more detailed view of FIG. 3 with different messaging schema shown.

As can be seen, the confluence Kafka has a connector called Confluence-MSK connector connecting the MSK bus. This connector is developed for communications between MSK and various network components such as BPI (Blue Planet Inventory), GO or BPA (an orchestrator for ZTP) as shown. As also can be seen individual adaptors are developed for individual components provided by different vendors. These individual adaptors can incorporate messaging for these components into the messaging schema supported by BPI, GO, or BPA. With the general architecture being described, attention is direct to individual communications between various components shown in FIG. 4.

GO to O-RAN EMS REST API

A payload in this messaging include the gNB_id, workflow to invoke and go_process_id. Th go_process_id is saved by a receiver, e.g. O-RAM EMS, etc., and is copied and sent back to GO when the receiver updates GO. The receiver will only maintain the latest process_id for a given site.

O-RAN EMS to GO

O-RAN EMS send success and failure messages to GO via the O-RAN status update message as defined below:

```
{
  "gNB_id": "xxxxxx_as_an_example",
  "fsm_state": "CX425", --- the state CX425 is copied from original GO message
  "fsm_status": "fail",
  "error_code": "error_001",
  "error_msg": "Failed to connect to Infoblox",
  "timestamp": "UTC date:HH:MM:SS",
  "go_process_id": "<copied from the original GO message>"
  "additional_data": { }
}
```

O-RAN EMS passes an error message if the EMS configuration action fails. Additional_data attribute is used to pass any extra information. The EMS retrieves the go_process_id from its database that was saved initially when the GO order was received and include it in the update message. MSK bus provides an adaptor to convert the REST message into MSK Kafka message, which will be further forwarded to Confluence Kafka bus via a MSK-Confluence Kafka bus connector.

GO to BPA REST API

The payload includes the site_id, workflow to invoke and go_process_id. The go_process_id is saved by the receiver, e.g. BPA, and is copied and sent back to GO when the receiver updates GO via the ZTP FSM status update messages. The receiver will only maintain the latest process_id for a given site. Payload for each workflow is captured below:

```
CU_VLAN
GO will call BPA after MA180.
{
  "site-id": "DADAL0001",
  "workflow": "CU_VLAN",
  "go_process_id": "<string_value>",
}
PRE_CSR (PRE_CSR, CSR, POST_CSR)
GO will call BPA after TR80. BPA will maintain the state internally and will call the next workflow/step i.e.,
PRE_CSR, CSR or POST_CSR etc.
{
  "site-id": "DADAL0001",
  "workflow": "PRE_CSR",
  "go_process_id": "<string_value>"
}
ZTPO (CHP, TCSA and RU)
GO will call BPA after TR82. BPA will maintain the state internally and will call the next workflow/step i.e., CHP, VCP etc.
{
  "site-id": "DADAL0001",
  "workflow": "ZTPO",
  "go_process_id": "<string_value>"
}
```

BPA to GO message structure for each phase with sample data is captured below:

```
BPA -> GO (CU_VLAN)
{
  "site-id": "ABC000000"
  "fsm_state": "CU_VLAN",
  "fsm_status": "fail",
  "error_code": "CUV_001"
  "error_msg": "Failed to connect to Infoblox",
  "timestamp": "UTC date:HH:MM:SS",
  "go_process_id": "<string_value>",
  "additional_data": { }
}
BPA -> GO (PRE_CSR)
{
  "site-id": "ABC000000"
  "fsm_state": "PRE_CSR",
  "fsm_status": "fail",
  "error_code": "GAZER_PRECSR_001"
  "error_msg": "Failed to allocate P2P values",
  "timestamp": "UTC date:HH:MM:SS",
  "go_process_id": "<string_value>",
  "additional_data": { }
}
BPA -> GO (CSR)
{
  "site_id": "ABC000000"
  "fsm_state": "CSR",
  "fsm_status": "fail",
  "error_code": "CSR_001"
  "error_msg": "Failed to apply day 1 coding to CSR",
  "timestamp": "UTC DATE:HH:MM:SS",
  "go_process_id": "string_value",
  "additional_data": { }
}
BPA -> GO(POST_CSR)
{
  "site_id": "ABC000000"
  "fsm_state": "POST_CSR",
  "fsm_status": "fail",
  "error_code": "GAZER_POSTCSR_001"
  "error_msg": "Failed to upgrade OS to 7.3.2",
  "timestamp": "UTC DATE HH:MM:SS",
  "go_process_id": "string_value",
  "additional_data": { }
}
BPA > GO: (CHP)
{
  "site_id": "ABC000000"
  "fsm_state": "CHP",
  "fsm_status": "fail",
  "error_code": "CHP_001"
  "error_msg": "pre ValidationFailureScriptNumber001",
  "timestamp": "UTC DATE:HH:MM:SS",
  "go_process_id": "string_value",
  "additional_data": { }
}
BPA -> GO (TCSA)
{
  "site_id": "ABC000000"
  "fsm_state": "VCP",
  "fsm_status": "fail",
  "error_code": "AIR_VCP_001"
```

```
      "error_msg": "preValidationFailureScriptNumber001",
      "timestamp": "UTC DATE:HH:MM:SS",
      "go_process_id": "string_value",
      "additional_data": { }
    }
    {
      "site_id": "ABC000000"
      "fsm_state": "NPC",
      "fsm_status": "fail",
      "error_code": "AIR_NPC_001"
      "error_msg": "preValidationFailureScriptNumber001",
      "timestamp": "UTC DATE:HH:MM:SS",
      "go_process_id": "string_value",
      "additional_data": { }
    }
    {
      "site_id": "ABC000000"
      "fsm_state": "DUI",
      "fsm_status": "fail",
      "error_code": "AIR_DUI_001"
      "error_msg": "preValidationFailureScriptNumber001",
      "timestamp": "UTC DATE:HH:MM:SS",
      "go_process_id": "string_value",
      "additional_data": { }
    }
BPA -> GO (RAN)
    {
      "site_id": "ABC000000"
      "fsm_state": "RAN",
      "fsm_status": "fail",
      "error_code": "RAN_001"
      "error_msg": "preValidationFailureScriptNumber001",
      "timestamp": "UTC DATE:HH:MM:SS",
      "go_process_id": "string_value",
      "additional_data": { }
    }
```

BPA passes the error message as it is received from the downstream system. Additional data attribute can be used to pass any extra information by a downstream system, but BPA will not pass it to GO. BPA will retrieve the go_process_id from its database that was saved initially when the order was received and include it in the Kafka message. BPA will add the error code based on the DISH error library in addition to the error message and the additional data to have more meaningful information in the ticket to the issue owner.

TCSA→BPA

TCSA to BPA communication will happen via MSK Kafka. Additional data attribute can be used to pass any extra information, but BPA will not pass it to GO. The notification message structure with payload example is defined below:

```
    {
      "site-id": "ABC000000"
      "fsm_state": "VCP",
      "fsm_status": "fail",
      "error_code": "AIR_VCP_001"
      "error_msg": "{error message from TCSA}",
      "timestamp": "UTC DATE:HH:MM:SS",
      "additional_data": { }
    }
    {
      "site-id": "ABC000000"
      "fsm_state": "NPC",
      "fsm_status": "fail",
      "error_code": "AIR_NPC_001"
      "error_msg": "{error message from TCSA}",
      "timestamp": "UTC DATE:HH:MM:SS",
      "additional_data": { }
    }
    {
      "site-id": "ABC000000"
      "fsm_state": "DUI",
      "fsm_status": "fail",
      "error_code": "AIR_DUI_001"
      "error_msg": "{error message from TCSA}",
      "timestamp": "UTC DATE:HH:MM:SS",
      "additional_data": { }
    }
```

Mavenir ACT to BPA

Mavenir to BPA communication happens via MSK Kafka. Additional_data attribute can be used to pass any extra information, but BPA does not pass it to GO. The notification message structure with payload example is defined below:

```
    {
      "site-id": "ABC000000"
      "fsm_state": "RAN",
      "fsm_status": "success/failed",
      "error_code": "RAN_001"
      "error_msg": "{message from Mavenir}",
      "timestamp": "UTC DATE:HH:MM:SS",
      "additional_data": {
        "ru_counter": 3,
        "num_cells_per_DU": 12,
        "status_cell1": "on_air",
        "status_cell2": "on_air",
        ...
        "status_cell12": "not_on_air"
      }
    }
```

Samsung vCU to BPA

Samsung vDU to BPA communication happens via MSK. Additional_data attribute can be used to pass any extra information, but BPA does not pass it to GO. The notification message structure with payload example is defined below:

1. vCU to BPA for the Resource Status Update

```
    {
      "site-id": "ABC000000"
      "fsm_state": "RAN",
      "fsm_status": "success/failed",
      "error_code": "RAN_001"
      "error_msg": "{message from Samsung}",
      "timestamp": "UTC DATE:HH:MM:SS",
      "additional_data": {
        "vCU-id": "xxxxx"
        "vCU-status": "ENABLED" or "DISABLED"
      }
    }
```

Samsung vDU to BPA

Samsung vDU to BPA communication happens via MSK. Additional_data attribute can be used to pass any extra information, but BPA may not pass it to GO. The notification message structure with payload example is defined below:

1. vDU to BPA for the Resource Status Update

```
    {
      "site-id": "ABC000000"
      "fsm_state": "RAN",
      "fsm_status": "success/failed",
      "error_code": "RAN_001"
      "error_msg": "{message from Samsung}",
      "timestamp": "UTC DATE:HH:MM:SS",
      "additional_data": {
```

| 1. vDU to BPA for the Resource Status Update |
|---|
| {<br>    "vDU-id": "xxxxx"<br>    "vDU-status": "ENABLED" or "DISABLED"<br>  }<br>} |

Samsung RU to BPA

Samsung RU to BPA communication happens via MSK. Additional_data attribute can be used to pass any extra information, but BPA may not pass it to GO. The notification message structure with payload example is defined below:

| 1. RU to BPA for the Resource Status Update |
|---|
| {<br>    "site-id": "ABC000000"<br>    "fsm_state": "RAN",<br>    "fsm_status": "success/failed",<br>    "error_code": "RAN_001"<br>    "error_msg": "{message from Samsung}",<br>    "timestamp": "UTC DATE:HH:MM:SS",<br>    "additional_data": {<br>        "RU-id": "SNxxxxx"<br>        "RU-status": "ENABLED" or "DISABLED"<br>    }<br>} |

Samsung vDU to BPA for RU-DU-CU Chaining Status Update

Samsung vDU to BPA communication happens via MSK. Additional_data attribute can be used to pass any extra information, but BPA may not pass it to GO. The notification message structure with payload example is defined below:

| 1. vCU to BPA for the Resource Status Update |
|---|
| {<br>    "site-id": "ABC000000"<br>    "fsm_state": "RAN",<br>    "fsm_status": "success/failed",<br>    "error_code": "RAN_001"<br>    "error_msg": "{message from Samsung}",<br>    "timestamp": "UTC DATE:HH:MM:SS",<br>    "additional_data": {<br>        "vCU-id": "xxxxx"<br>        "vDU-id": "xxxxx"<br>        "total_num_cells": 9<br>        "num_cells_on_air": 9<br>        "list_cells_on_air": { }<br>    }<br>} |

BMO to BPA

BMO to BPA communication happens via MSK Kafka. Additional_data attribute can be used to pass any extra information, but BPA will not pass it to GO. The notification message structure with payload example is defined below:

```
{
    "site-id": "ABC000000"
    "fsm_state": "CHP",
    "fsm_status": "success/failed",
    "error_code": "AIR_VCP_001"
    "error_msg": "{message from BMO}",
    "timestamp": "UTC DATE:HH:MM:SS",
    "additional_data": {
        "server_name": "Server1",
        "bmo_site_name": "gc",
        "bmo_failure_stage": "OSInstall",
        "server_status": "Ready",
        "server_exi_mac":"",
        "server_os_ip": 1.1.1.1
    }
}
```

Example Computing System

Figure 5:
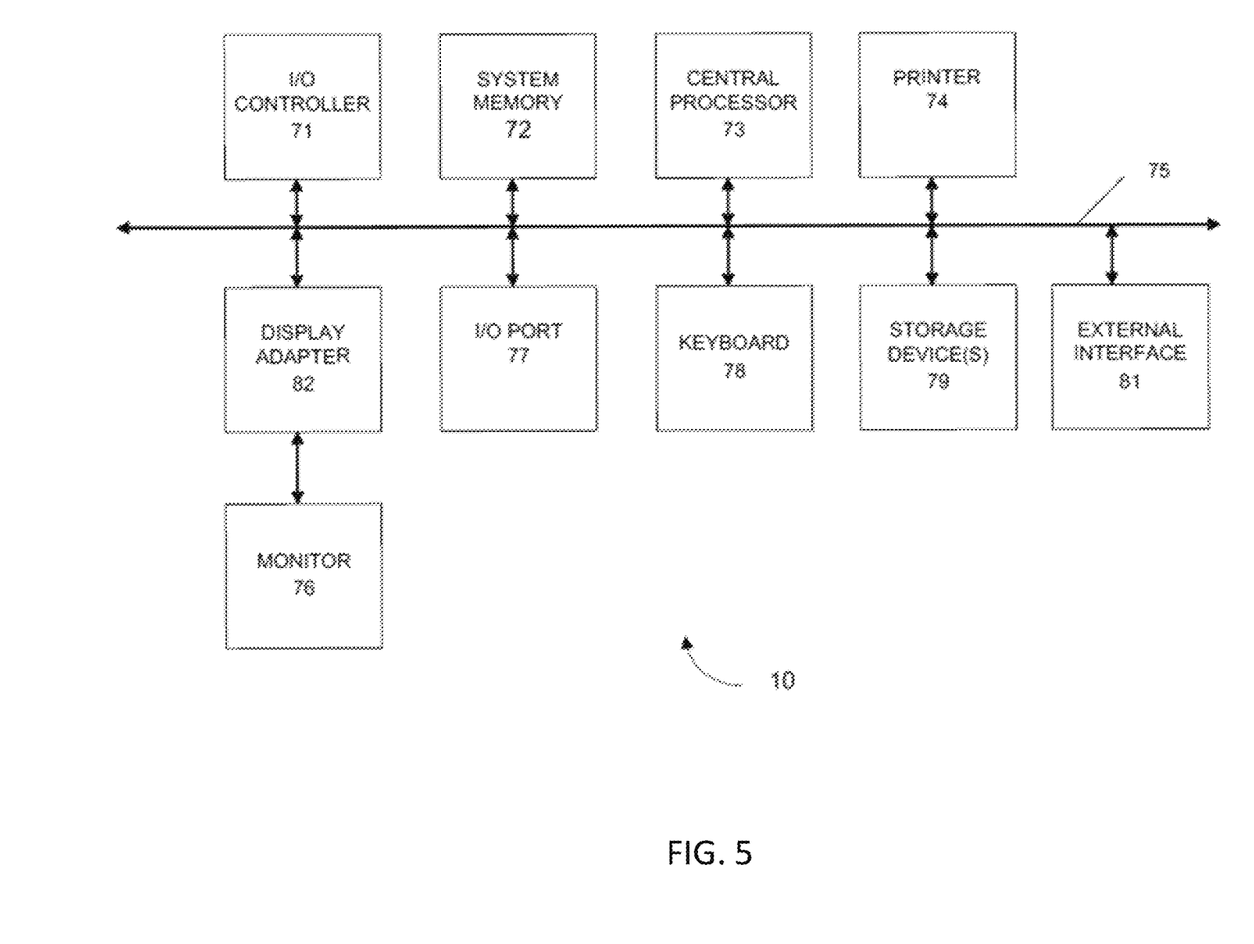
FIG. 5 generally illustrates an example of a computer system that can be used to implement various embodiments.

Any of the embodiments mentioned herein may be implemented by or utilize any suitable number of subsystems. Examples of such subsystems are shown in FIG. 5 in computing system 10, which can be configured to implement various features and/or functions described herein. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 5 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of instructions from system memory 72 or the storage device(s) 79 (e.g., a fixed disk, such as a hard drive or optical disk), as well as the exchange of information between subsystems. The system memory 72 and/or the storage device(s) 79 may embody a computer readable medium. Any of the data mentioned herein can be output from one component to another component and can be output to the user.

A computer system can include a plurality of the same components or subsystems, e.g., connected together by external interface 81 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A system configured to facilitate message exchange within an open radio access network (O-RAN), wherein the system comprises:
   a message bus configured to facilitate real-time message streaming and message exchange;
   adaptors configured to connect components provided by vendors to the O-RAN, the adaptors including a first adaptor for a first component, that provides first functionality, provided by a first vendor and a second adaptor for a second component, that provides the first functionality, provided by a second vendor; and
   connectors configured to connect network components facilitating the O-RAN, the connectors including a first connector for a first network component that is an orchestrator configured to manage the first component and the second component; and, wherein
   the first adaptor is configured to receive a first message that follows a first message format from the first component, translate the first message into a common message format, and provide the first message to the message bus;
   the message bus is configured to transmit the first message to the first connector; and
   the first connector is configured to transmit the first message to the first network component.

2. The system of claim 1, wherein the second adaptor is configured to receive a second message from the second component, the second message having a second message format that is different from the first message format, the second adaptor is configured to translate the second message into the common message format and provide the second message to the message bus; and, wherein
   the message bus is configured to transmit the second message to the first connector; and
   the first connector is configured to transmit the second message to the first network component.

3. The system of claim 1, wherein the connectors include a second connector for a second network component; and, wherein
   the message bus is configured to transmit the first message to the second connector; and
   the second connector is configured to transmit the first message to the second network component.

4. The system of claim 1, wherein the connectors include a second connector for a second network component; and, wherein
   the second adaptor is configured to receive a second message from the second component, the second message having a format different from the first message, the second adaptor is configured to translate the second message into the common message format and provide the second message to the message bus;
   the message bus is configured to transmit the second message to the second connector; and the second connector is configured to transmit the second message to the second network component.

5. The system of claim 1, wherein the message bus is a Kafka messaging bus.

6. The system of claim 1, wherein the common message format includes JSON, JSON Schema, Avro or Profobuf.

7. The system of claim 1, wherein the first component is a first DU and the second component is a second DU.

8. The system of claim 1, wherein the first network component is a workflow management component, or an inventory management component.

9. The system of claim 8, wherein the workflow management component is GO, and the inventory management component is a Blue Planet Inventory (BPI) system or NX1 database.

10. A method implemented by computer system to facilitate message exchange within an open radio access network (O-RAN), wherein when the method is executed, the computer system comprises a message bus configured to facilitate real-time message streaming and message exchange, adaptors configured to connect components provided by vendors to the O-RAN, the adaptors including a first adaptor for a first component, that provides first functionality, provided by a first vendor and a second adaptor for a second component, that provides the first functionality, provided by a second vendor, connectors configured to connect network components facilitating the O-RAN, the connectors including a first connector for a first network component that is an orchestrator configured to manage the first component and the second component; and, wherein the method comprises:

receiving, at the first adaptor, a first message that follows a first message format from the first component, translate the first message into a common message format, and provide the first message to the message bus;

transmitting, at the message bus, the first message to the first connector; and transmitting, at the first connector, the first message to the first network component.

11. The method of claim 10, further comprising:

receiving, at the second adaptor, a second message that follows a second message format from the second component, the second message format different from the first message format, the second adaptor is configured to translate the second message into the common message format and provide the second message to the message bus; and, wherein the method further comprises:

transmitting, at the message bus, the second message to the first connector; and transmitting, at the first connector, the second message to the first network component.

12. The method of claim 10, wherein the connectors include a second connector for a second network component; and, wherein the method comprises:

transmitting, at the message bus, the first message to the second connector; and transmitting, at the second connector, the first message to the second network component.

13. The method of claim 10, wherein the connectors include a second connector for a second network component; and, wherein the method comprises:

receiving, at the second adaptor, a second message from the second component, the second message having a format different from the first message, wherein the second adaptor is configured to translate the second message into the common message format and provide the second message to the message bus;

transmitting, at the message bus, the second message to the second connector; and transmitting, at the second connector, the second message to the second network component.

14. The method of claim 10, wherein the message bus is a Kafka messaging bus.

15. The method of claim 10, wherein the common message format includes JSON, JSON Schema, Avro or Profobuf.

16. The method of claim 10, wherein the first component is a Telco Cloud Automation orchestrator.

17. The method of claim 10, wherein the first network component is a workflow management component, or an inventory system.

18. The method of claim 17, wherein the workflow management component is GO.

\* \* \* \* \*